Nov. 15, 1938.     L. BOSSCHIETER     2,136,838
COLLAPSIBLE CHAIR
Filed Jan. 7, 1936
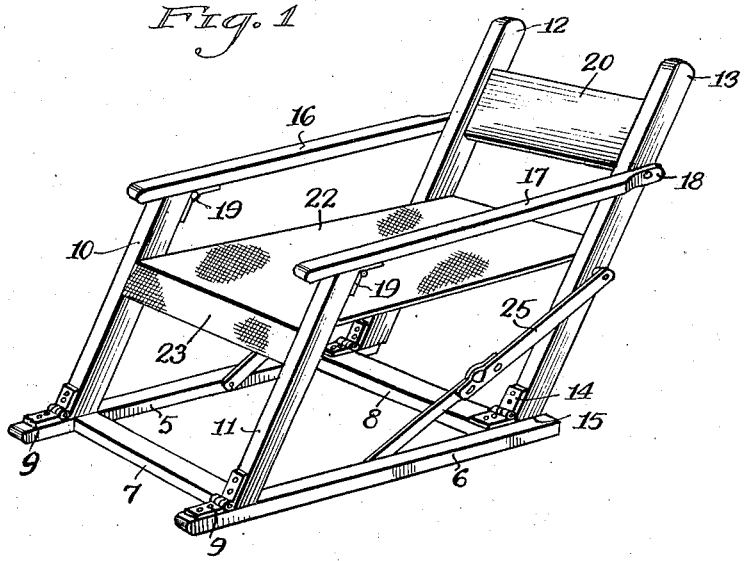
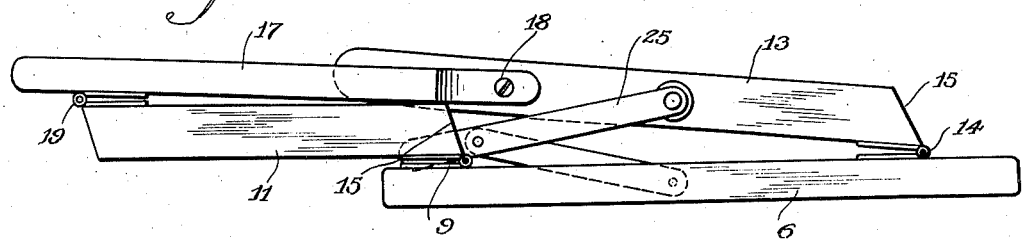
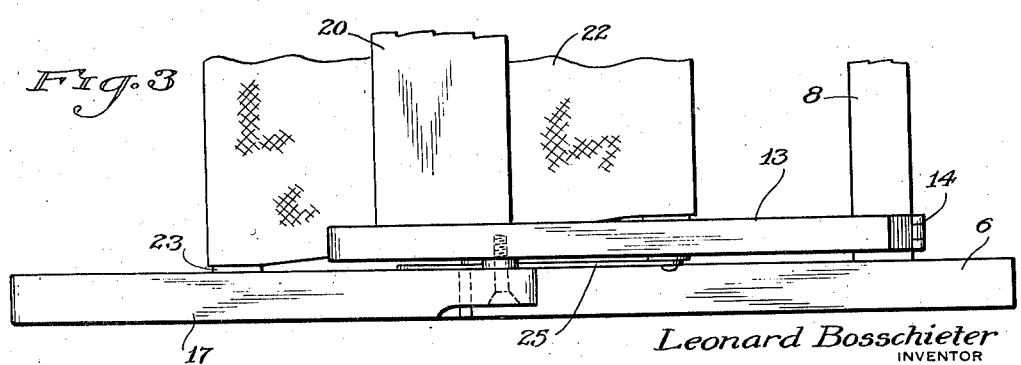
Leonard Bosschieter
INVENTOR
BY Victor J. Evans & Co.
ATTORNEY Patented Nov. 15, 1938

2,136,838

UNITED STATES PATENT OFFICE 2,136,838

COLLAPSIBLE CHAIR

Leonard Bosschieter, Prospect Park, N. J.

Application January 7, 1936, Serial No. 58,002

1 Claim. (Cl. 155—141)

The present invention relates to a new and improved collapsible chair and finds its greatest utility when used in conjunction with a seat of an automobile for supporting a small child.

The primary object of the invention is to provide a chair that can be folded in compact form so as to require a minimum amount of space when not in use and may be transported in an automobile or other vehicle.

A further object of the invention is to provide a chair that may be easily and readily collapsed, yet when in set-up position will conform to the general contour of the seat on which it is positioned for safely supporting a small child without danger of the chair becoming tilted during the travel of the automobile.

A still further object is to construct the seat portion of a collapsible chair in such a manner as to hold a small child in a substantially upright position, which may be accomplished irrespective of the slant of the automobile seat with which the chair is used.

The invention will be fully and comprehensively understood from a consideration of the following detailed description when read in connection with the accompanying drawing which forms part of the application.

In the drawing:

Fig. 1 is a perspective view of the chair in set-up position.

Fig. 2 is a side elevational view of the chair in its folded or collapsed position; and Fig. 3 is a top plan view of a fragmentary portion of the chair in its collapsed position.

While the invention has not been illustrated in use with an automobile seat, it is to be understood that it finds its greatest utility in connection therewith. The carrying of a small child in an automobile represents a certain responsibility. The child is not large enough to obtain a clear vision of the surroundings while positioned on the usual seat. The usual practice is to have the child stand at an upright position, thus necessitating constant watch and care on the part of the other occupants of the vehicle. If the automobile should come to a sudden stop or make a sharp turn, there is a great possibility of the child falling and injuring himself.

The present invention was devised to overcome the above-mentioned hazards. The chair is collapsible to facilitate transportation and when in set-up position will effectively support a small child within a minimum amount of space.

The chair comprises a pair of horizontal supporting members 5 and 6 held in spaced relation thru the medium of the cross members 7 and 8, which are attached to said horizontal members 5 and 6 by any desired means to constitute a base for the chair. The horizontal members 5 and 6 have a substantially flat bottom surface for engagement with the seat cushion of an automobile and when so positioned are prevented from sliding or tilting during the travel of the automobile.

Projecting from the members 5 and 6, and having their lower extremities pivotally connected thereto thru a pair of hinges 9, are the vertical upright members 10 and 11, and likewise secured to the cross member 8 are a second pair of vertical upright members 12 and 13 which aid in forming the back of the seat. The said uprights 12 and 13 are hingedly connected to the cross member 8 thru the medium of the hinges 14. It will be noted that the first-mentioned uprights 10 and 11 are of a length shorter than the second mentioned uprights 12 and 13 and that the latter are not spaced as far apart as the members 10 and 11 to lie between the same when the chair is collapsed. The lower edges of the uprights 10, 11, 12 and 13, respectively, which contact with the supporting members for the chair, are suitably bevelled as indicated at 15.

A pair of arms 16 and 17 are attached to the vertical uprights. The arms are similarly attached and it will be noted that one end of the arm 17 is pivotally attached to the upright 13, as indicated at 18, and has its other end hingedly secured to the upright 11 thru the medium of the hinge 19. The same mode of attachment is in effect in connection with the arm 16. For further aiding in the supporting of the uprights 12 and 13 there is provided the spacing member 20 attached to said uprights in any desired manner. Positioned below the spacing member 20 and secured to the uprights 12 and 13 is the member 21 which aids in forming the seat portion 22. At the forward end of the chair and attached to the uprights 10 and 11 is the spacing member 23 which forms the other part of the seat supporting surface. A strip of canvas or like material is attached to and stretched over the members 21 and 23. The member 21 lies in a plane slightly above the member 23 so as to impart a slanting effect to the seat 22. As is well known, automobile seats are constructed so that the front end is more elevated than the rear end and it is to compensate for this difference that the seat portion 22 of the chair has been arranged at an angle. It is not desirous to have a small child sitting at an angle either forwardly or backwardly but preferable to have him on a substantially horizontal seat. This position will be effected thru the use of the construction herein described.

To further aid in strengthening the chair a pair of collapsible braces 24 and 25 are pivotally connected to the insides of the supporting members 5 and 6 and the outsides of the vertical upright members 12 and 13, respectively. The braces are pivoted intermediate their ends and when in open or extended position act as a locking medium.

The beveled ends of the members 10 and 11 make it possible to set up the chair for use without the braces 24 and 25, it being apparent that said beveled ends will cooperate with members 5, 6, 16 and 17 for that purpose with the seat horizontally disposed.

The use and practicability of the new and improved chair is believed to be obvious from the above description. The members 5, 6, 7 and 8 comprising the base of the chair, when resting on an auto seat, cooperate therewith as hereinbefore mentioned whereby movement of the chair relative to the seat is largely inhibited. The upright members 12 and 13, which, it will be noted, can be disposed relative to the base components whereon they are mounted at an angle greater than a right angle, normally rest against the back of the auto seat. The inclination of the upright members, however, does not materially alter the spaced relationship existing between the base members and the members comprising the seat portion proper, accordingly it will be apparent that the child's seat is substantially the equivalent of the auto seat but is raised above the level thereof for the purposes hereinabove referred to. This will assure the child remaining in an upright position and at the same time reduce to a minimum the danger of the child falling or the chair becoming tilted.

What is claimed as new is:

A collapsible chair comprising a supporting base consisting of interconnected members presenting flat bottom surfaces, front and rear upright members having their lower extremities hingedly connected with said base, arm rest members hingedly connected with the upper extremities of said front upright members respectively and pivotally connected with said rear upright members on the outside thereof, and a seat supported by said front and rear upright members, the upper and lower ends of said front upright members being beveled so as to cooperate with said base and arm rest members whereby to set up the chair for use.

LEONARD BOSSCHIETER.